Sept. 8, 1964  G. W. ONKSEN ETAL  3,148,306

DUAL BRIGHTNESS STOP AND TURN SIGNAL SYSTEM

Filed Aug. 15, 1960

INVENTORS
George W. Onksen
HOWARD I. SLONE
BY Paul J. Ethington
ATTORNEY 3,148,306
DUAL BRIGHTNESS STOP AND TURN
SIGNAL SYSTEM
George W. Onksen, Anderson, Ind., and Howard I. Slone,
Birmingham, Mich., assignors to General Motors Corporation, Detroit, Mich., a corporation of Delaware
Filed Aug. 15, 1960, Ser. No. 49,616
4 Claims. (Cl. 315—82)

This invention relates to illumination systems for motor vehicles.

Motor vehicles for highway use are commonly provided with headlamps, tail lamps and parking lamps which may be referred to collectively as operating lamps. In addition, they ordinarily are equipped with a brake or stop signal lamp and turn indicator lamps which may be collectively referred to as warning or signal lamps. In some arrangements the warning lamps, or some of them, may utilize the same filaments as some of the operating lamps.

In any event, in known vehicle illumination systems, the warning lamps have been unsatisfactory because if they are of sufficient brilliance to command attention during daylight driving conditions, they are too bright and cause objectionable glare under twilight or night driving conditions.

The principal object of this invention is to provide a solution for this problem by modifying the brilliance of the warning lamps so that they may be of full brilliance during daytime conditions and of reduced brilliance at night. A further object of the invention is to provide this result in such wise that the result is obtained substantially automatically and with a minimum of attention from the operator of the vehicle. A further object is to provide for reducing the brilliance of the warning lamps by a system which is simple and which is well adapted to incorporation in warning signal systems of the most desirable characteristics.

In the preferred embodiments of the invention, the brilliance of the warning lamps is reduced whenever the operating lamps, or any of them, are energized so that whenever light conditions are such as to require the use of the operating lamps, the warning lamps are dimmed. This may be accomplished in various manners but is preferably accomplished by reducing the voltage applied to the warning lamps by the insertion of a dimming resistor or resistors in the energizing circuits of the lamps.

Conventional turn indicator lamps are connected to the terminal of the flasher, herein called the load terminal, thereby placing the lamps in series with the flasher operating mechanism. Consequently, when a turn lamp burns out or the load on the flasher otherwise varies, the flasher will undergo a change of frequency or will become entirely inoperative. A pilot lamp connected to the pilot terminal of the flasher is energized each time the turn lamps are flashed. Hence, when the flasher frequency varies or the flasher becomes inoperative due to a burned-out lamp, this condition is made known to the vehicle operator due to the resulting erratic action of the pilot lamp. The amount of load on the pilot terminal of the flasher does not, however, affect the operation of the flasher.

It has been previously proposed to vary the intensity of turn indicator lamps by placing a resistor in series with the lamps thereby changing the voltage drop across the lamp. This, however, changes the total load on the load terminal of the flasher thereby changing the rate of flashing, and elaborate circuits have been devised to compensate for this change of load. Another object of this invention, then, is to provide a solution for this problem by connecting constant intensity lamps to the load terminal of the flasher and by connecting the variable intensity lamps to the pilot terminal.

The above and other advantages of the invention will become more apparent in the following description and the accompanying drawings in which like numerals refer to like parts and in which.

Figure 1:
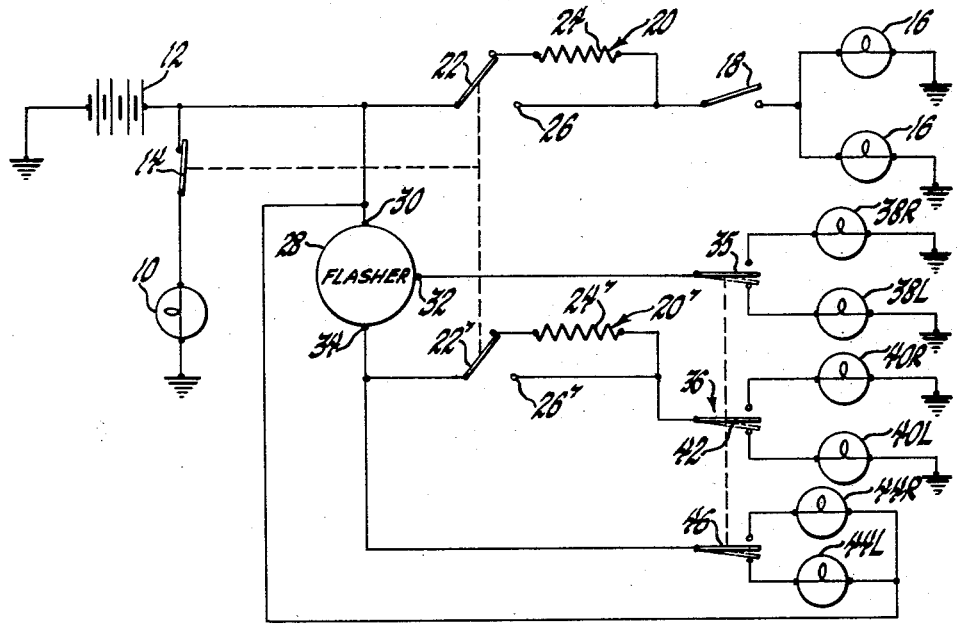
FIGURE 1 is a schematic circuit diagram of one embodiment of the invention.

Referring to the drawings, FIGURE 1 illustrates a vehicle lighting system comprising both operating lamps and warning or signal lamps. The operating lamps are collectively represented by a lamp 10 connected between the vehicle battery 12 and ground and having a headlamp switch 14 in series therewith.

A stop lamp circuit is composed of a pair of stop lamps 16 arranged in parallel and connected through a brake-operated stop switch 18 and a variable resistance circuit 20 to the battery 12. The variable resistance circuit comprises a switch 22 which selectively connects a resistance 24 into the circuit. The switch 22 is mechanically connected to the headlamp switch 14, as is indicated by dotted lines, and is preferably constructed by providing additional contacts on the headlamp switch 14. The switch 22 is moved to the upward position when the headlamp switch 14 is closed thereby placing the resistance 24 into the stop lamp circuit to decrease the stop lamp intensity below the normal daytime intensity. When the headlamp switch 14 is open, the switch 22 contacts terminal 26 thereby connecting the stop switch 18 directly to the battery 12 to provide normal intensity.

A flasher 28, having an input terminal 30, a load terminal 32 in series with the internal actuating mechanism (not shown) of the flasher, and a pilot terminal 34, has its input terminal 30 connected to the battery 12. The load terminal 32 is connected through one contact 35 of the turn signal switch 36 to either one of a pair of right and left front turn signal lamps 38R and 38L, respectively. These lamps will have the same intensity regardless of the position of the headlamp switch 14 and, accordingly, the load on the flasher mechanism will be constant thereby assuring stable operation. A pair of right and left rear turn lamps 40R and 40L, respectively, is connected through a second contact 42 of the turn signal switch and a second variable resistance circuit 20' to the pilot terminal 34 of the flasher 28. This variable resistance circuit 20' is identical in construction and operation to the first variable resistance circuit 20 described above. Accordingly, the rear turn lamps 40R and 40L will be decreased in intensity during the periods when the headlamp switch 14 is closed. The consequent variation in load on the pilot terminal 34 of the flasher will not affect the operation of the flasher since the flashing mechanism is independent of the current through the pilot terminal 34.

A pilot lamp circuit comprises a pair of right and left pilot lamps 44R and 44L, respectively, connected at one side to the battery 12 and at the other side through a third contact 46 on the turn signal switch 36 to the pilot terminal 34 of the flasher 28. In operation, when the turn signal switch 36 is moved downwardly, for example, as shown in broken lines, the left pilot lamp 44L will be connected to ground through the turn switch contact 46, the variable resistance contact 22', the contact 42 on the turn switch 36 and the left rear turn lamp 40L to ground. Thus, during those periods when the pilot terminal 34 is not energized, current will flow through the pilot lamp 44L to ground; but during those periods when the pilot terminal 34 is energized, the pilot lamp 44L is shunted out with the result that the pilot lamp will flash alternately with the rear turn lamp. It is noted that the small current drawn by the pilot lamp 44L is insufficient to actuate the turn lamp 40L. When the rear turn lamp 40L is burned out, however, the pilot lamp 44L will no longer be grounded and will not flash. On the other hand, if a front turn lamp 38L burns out, the load on the load terminal 32 of the flasher 28 will be changed so as to render the flasher action erratic. Therefore, in either case, the vehicle operator will be warned by the pilot lamp 44L of any defective condition of the turn lamps 38L and 40L.

Figure 2:
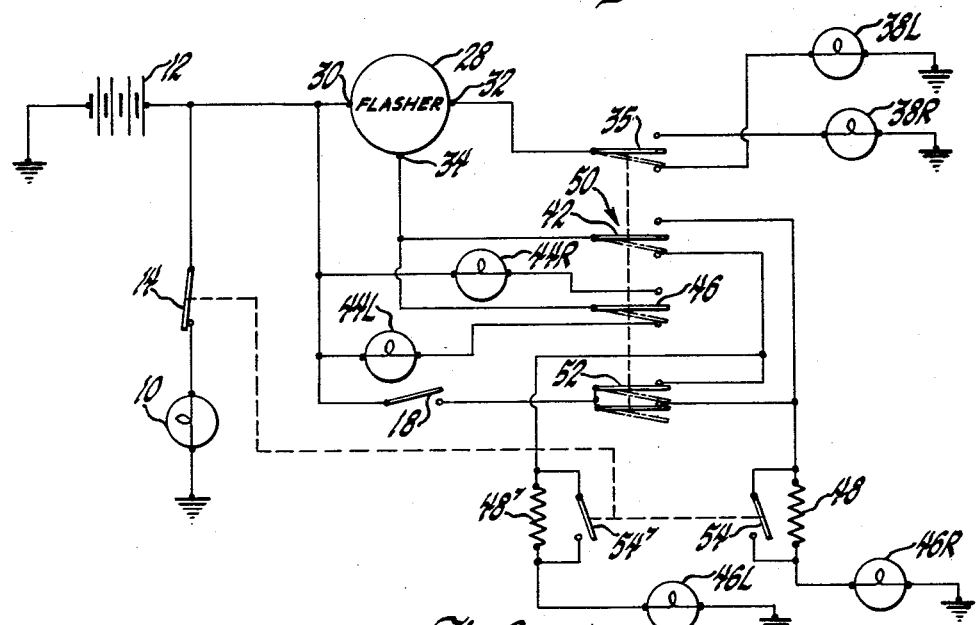
FIGURE 2 is a schematic circuit diagram of a second embodiment of the invention.

The circuit shown in FIGURE 2 is somewhat similar to that of FIGURE 1 except that it has been modified to accommodate combination stop and rear turn signal lamps 46R and 46L, whereas the circuit of FIGURE 1 requires the use of separate stop lamps 16 and turn lamps 40R and 40L on the rear of the vehicle or at least lamps having a separate filament for each function. It is readily seen that the front turn signal circuit, the pilot lamp circuit and the flasher arrangement are identical to that described above for FIGURE 1. The rear warning lamp circuit comprises a pair of right and left rear lamps 46R and 46L, respectively, each of which is connected in series with a resistance 48, 48' and which lamps are selectively connectable to the pilot terminal 34 of the flasher through a contact 42 on the turn signal switch 50. In addition, the lamps 46R and 46L are connected either singly or jointly to the stop lamp circuit by a switch 52 which includes a pair of contacts connected to the battery 12 through a brake-operated stop switch 18. As indicated by dotted lines, the two-contact stop lamp switch 52 is mechanically connected with the turn signal switch 50 so that, when the turn signal switch 50 is in neutral position (solid lines), the contacts will close the circuit from the stop switch 18 to both lamps 46R and 46L. However, when the turn signal switch 50 is moved to indicate a left turn, for example, as indicated by broken lines, only the right lamp 46R will be connected with the stop switch 18 while the left lamp 46L is connected through the turn signal switch contact 42 to the pilot terminal 34 of the flasher 32. In order to vary the intensity of the combination stop and turn lamps 46R and 46L, switches 54 and 54' mechanically connected to the headlamp switch 14 are located to shunt out the resistances 48 and 48' in the lamp circuits when the headlamp switch 14 is open. Hence, as in the circuit of FIGURE 1, the rear lamps 46R and 46L will be decreased in intensity when the headlamp switch 14 is closed thereby minimizing glare during normal night operation.

It is to be understood that the above-described embodiments of the invention are for purposes of illustration only and are not to be taken to limit the scope of the invention which is defined in the following claims.

We claim:
1. A dual intensity vehicle turn signal system comprising, an electrical power source, a flasher having an input terminal connected to one pole of the power source a load terminal and a pilot terminal wherein the flashing rate thereof is dependent on the current through the load terminal and is independent of the current through the pilot terminal, switch means, substantially constant intensity signal lamps each having one side selectively connectable through said switch means to said load terminal, variable intensity signal lamps each having one side selectively connectable by said switch means to said pilot terminal, the other side of said lamps electrically connected to the other pole of the power source, and variable resistance means connected with said variable intensity lamps for varying the intensity thereof.

2. A dual intensity vehicle warning lamp system comprising, an electrical power source, a flasher having an input terminal connected to one pole of the power source a load terminal and a pilot terminal wherein the flashing rate is dependent on the current through the load terminal and is independent of the current through the pilot terminal, switch means, substantially constant intensity signal lamps each having one side selectively connectable through said switch means to said load terminal, variable intensity signal lamps each having one side selectively connectable by said switch means to said pilot terminal, the other side of said lamps electrically connected to the other pole of the power source, variable resistance means connected with said variable intensity lamps for varying the intensity thereof, and pilot lamp means connected between said input terminal and said pilot terminal whereby said pilot lamp is connected through said switch means to said variable resistance means and said variable intensity lamps.

3. A dual intensity vehicle warning lamp system comprising, an electrical power source, a flasher having an input terminal connected to one pole of the power source a load terminal and a pilot terminal wherein the flashing rate thereof is dependent on the current through the load terminal and is independent of the current through the pilot terminal, switch means, substantially constant intensity turn signal lamps each having one side selectively connectable through said switch means to said load terminal, variable intensity turn signal lamps each having one side selectively connectable by said switch means to said pilot terminal, the other side of said lamps electrically connected to the other pole of the power source, variable resistance means connected with said variable intensity lamps for varying the intensity thereof, and a stop light circuit including stop lamps in series with the power source a brake-actuated stop switch and a second variable resistance means for varying the intensity of said stop lamps.

4. A dual intensity vehicle warning lamp system comprising an electrical power source, a flasher having an input terminal connected to one pole of the power source a load terminal and a pilot terminal wherein the flashing rate thereof is dependent on the current through the load terminal and is independent of the current through the pilot terminal, switch means, substantially constant intensity turn signal lamps each having one side selectively connectable through said switch means to said load terminal, combination stop and turn lamps each having one side selectively connectable by said switch means to said pilot terminal, the other side of said lamps electrically connected to the other pole of the power source, variable resistance means connected with said combination lamps for varying the intensity thereof, and a stop lamp circuit having a brake-actuated stop switch connected to said power source and connectable to each of said combination lamps through said variable resistance means.

References Cited in the file of this patent
UNITED STATES PATENTS

| | | |
|---|---|---|
| 1,330,571 | Axtell | Feb. 10, 1920 |
| 2,521,304 | North | Sept. 5, 1950 |
| 2,731,584 | Onksen | Jan. 17, 1956 |
| 3,040,207 | Grontkowski | June 19, 1962 |

FOREIGN PATENTS

| | | |
|---|---|---|
| 820,669 | Great Britain | Sept. 23, 1959 |